United States Patent
Pascall et al.

(10) Patent No.: US 10,130,899 B2
(45) Date of Patent: Nov. 20, 2018

(54) SEPARATING COMPONENTS OF MIXED FLUID USING A FUNCTIONALLY GRADED MATERIAL

(71) Applicant: Lawrence Livermore National Security, LLC, Livermore, CA (US)

(72) Inventors: Andrew J. Pascall, Livermore, CA (US); George R. Farquar, Livermore, CA (US); Christopher M. Spadaccini, Livermore, CA (US); Sarah C. Chinn, Redwood City, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1072 days.

(21) Appl. No.: 13/744,270

(22) Filed: Jan. 17, 2013

(65) Prior Publication Data
US 2013/0186832 A1    Jul. 25, 2013

Related U.S. Application Data

(60) Provisional application No. 61/588,870, filed on Jan. 20, 2012.

(51) Int. Cl.
*B01D 15/22* (2006.01)
*B01D 15/18* (2006.01)

(52) U.S. Cl.
CPC ......... *B01D 15/18* (2013.01); *B01D 15/1821* (2013.01); *B01D 15/1828* (2013.01); *B01D 15/1842* (2013.01); *B01D 15/1864* (2013.01); *B01D 15/1885* (2013.01); *B01D 15/22* (2013.01); *B01D 15/1857* (2013.01)

(58) Field of Classification Search
None
See application file for complete search history.

(56) References Cited

U.S. PATENT DOCUMENTS

| | | | | |
|---|---|---|---|---|
| 4,182,633 A | * | 1/1980 | Ishikawa et al. | 127/46.2 |
| 4,293,346 A | * | 10/1981 | Landis et al. | 127/46.2 |
| 4,404,037 A | * | 9/1983 | Broughton | 127/55 |
| 4,409,033 A | * | 10/1983 | LeRoy | 127/46.2 |
| 5,133,844 A | | 7/1992 | Stevens et al. | |

(Continued)

OTHER PUBLICATIONS

Camenzuli, M., Ritchie, H., Ladine, J., Shalliker, A. The design of a new concept chromatography col. 17 Oct. 2011.*

*Primary Examiner* — Kara M Peo
(74) *Attorney, Agent, or Firm* — Eddie E. Scott

(57) ABSTRACT

A system for separating components of a fluid containing at least a first component and a second component includes a device having an inlet for introducing the fluid into the device, a first outlet for directing the first component of the fluid from the device, and a second outlet for directing the second component of the fluid from the device. A material that has a gradient in properties is located in the device between the inlet and the first and second outlets. The material has a first portion with an affinity for the first fluid component and a second portion with an affinity for the second fluid component. The first portion is positioned with relation to the first outlet such that the first component is directed from said device through the first outlet. The second portion is positioned with relation to the second outlet such that the second component is directed from the device through the second outlet.

2 Claims, 10 Drawing Sheets

(56) References Cited

U.S. PATENT DOCUMENTS

| | | | |
|---|---|---|---|
| 5,160,625 A | | 11/1992 | Jonsson et al. |
| 5,972,224 A | * | 10/1999 | Hotier et al. ................ 210/659 |
| 6,015,491 A | * | 1/2000 | Renard et al. ............ 210/198.2 |
| 6,375,851 B1 | * | 4/2002 | Sterling et al. ............... 210/677 |
| 2005/0224402 A1 | * | 10/2005 | Kerhuel ................ G01N 30/84 210/198.2 |
| 2008/0179243 A1 | | 7/2008 | Hirsh et al. |
| 2009/0209736 A1 | * | 8/2009 | Theoleyre et al. ........... 530/413 |

\* cited by examiner

SEPARATING COMPONENTS OF MIXED FLUID USING A FUNCTIONALLY GRADED MATERIAL

CROSS-REFERENCE TO RELATED APPLICATIONS

This application claims benefit under 35 U.S.C. § 119(e) of U.S. Provisional Patent Application No. 61/588,870 filed Jan. 20, 2012 entitled "A Method of Separating Components of Mixed Fluid using a Gradient Material," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to chemical separation and more particularly to a system of separating chemical components of mixed fluid or multiple components dissolved in a solvent or carrier gas using a functionally graded material.

State of Technology

The present invention relates to separating a multicomponent mixture of chemicals into multiple streams enriched in an individual component or components. Processes exist for separating components of a fluid such as filtration, distillation, chromatography, and other separation techniques. For example; U.S. Pat. No. 5,160,625 describes "Field flow fractionation, a method obtaining high resolution separations of organic and inorganic colloids and soluble molecules, has been known in the art for approximately twenty years." The patent states: "In field flow fractionation, a solution, having solute molecules dissolved therein, is made to flow through a working chamber formed in a fractionating conduit. Fluid flow in the working chamber is generally laminar in nature. The solute species is added in a concentrated form to a carrier solvent that is already present in and flowing through the working chamber. Usually, the construction of the working chamber is capillary in nature, i.e., having relatively small and generally uniform transverse cross-sectional dimensions in comparison to its axial length. The working chamber may have a simple cylindrical shape or may be of a generally rectangular cross-sectional configuration. In the case of a rectangular cross-sectional configuration, the working chamber has a depth substantially smaller than its width, so that solution flow through the working chamber is in the form of a thin layer. Under conditions of laminar fluid flow in a fractionating conduit, the flow velocity of any given fluid particle through the working chamber is a function of the distance of the fluid particle from the conduit wall. The velocity of a given fluid particle ranges from a maximum at a position midway between opposing conduit walls to a theoretical minimum of zero at the conduit wall. Thus, in the case of a rectangular working chamber, laminar fluid flow exhibits a velocity profile in the shape of a parabolic curve, the greatest velocity being at the transverse midpoint of the chamber. This velocity profile of the laminar fluid flow is advantageously used with the desired "field" to selectively separate or fractionate solute molecules from the flowing carrier solvent in the working chamber.'

Another example is U.S. Pat. No. 5,133,844 that describes "Field flow fractionation (FFF), pioneered by Giddings (Sep. Sci. 1966, 1, 123) is a versatile family of separation methods related to liquid chromatography. Since none of the subtechniques are utilizing a stationary phase for separation and therefore do not depend on an equilibrium process like classical chromatography, FFF is not in a strict sense a member of the family of chromatographic techniques. FFF involves the application of an external force field to a solution, causing a migration of its constituents towards the separation channel wall. Depending on the magnitude of the force field and on chemical/physical properties, a certain solute will eventually reach a certain concentration distribution resulting in a fixed distance from the separation channel wall, this process is called relaxation. If the solution in the channel is caused to move forward in a laminar way, a parabolic flow profile will develop and the constituents will move forward with velocities equal to that axial velocity vector where most of the solute is located.

The applied field may e.g. be thermal gradients (thermal FFF), centrifugal forces (sedimentation FFF), electrical forces (electrical FFF), transverse or lateral flow (flow FFF) and transverse pressure gradients (pressure FFF)."

Another example is United States Published Patent Application No. 2008/0179243 that states: "Historically, gradient based liquid phase chromatography has played a seminal role in molecular separation science. Originally limited to aqueous ion exchange chromatography, in recent years it has blossomed into numerous useful variations based on hydrophobic interactions and combinations of hydrophobic and hydrophilic interactions including a wide range of mobile and stationary phase chemistries. Despite this wide range of compositions, a universal feature of the current gradient technologies is a focusing of each band of eluted molecules because of increased binding to the stationary phase downstream and decreased binding upstream. This results in a velocity gradient in the eluted species that acts to counter the dispersive forces that would otherwise broaden the elution bands as they travel through the stationary phase. Concentrating eluted material into narrower bands is highly desirable because it leads to better separation of forms that elute at nearly the same conditions, a property known as selectivity, as well as providing a more homogeneous purified product. However, aside from the dispersive forces themselves, there is an intrinsic limitation to the focusing strength of these systems as relates to the challenge of selectivity. Generally, to achieve greater selectivity the gradient in eluent composition should be reduced. This increases the number of stationary phase volumes (or time) between an elution band and its nearest neighbors. Nevertheless, it also decreases the focusing strength of differential binding, so the peaks become broader as a function of stationary phase volumes. Since optimum selectivity is characterized by a maximum ratio of band separation to band width, called resolution, the tradeoff of flattening the gradients always leads to an optimal minimum slope."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for separating components of a fluid. The fluid contains at least a first component and a second component. The fluid may contain additional components and the present invention also provides a system for separating these additional components. The system includes a device having an inlet for introducing the fluid into the device. The device has a first outlet for directing the first component of the fluid from the device and a second outlet for directing the second component of the fluid from the device. A material that has a gradient in properties is located in the device between the inlet and the first and second outlets. The material has a first portion with an affinity for the first component fluid and a second portion with an affinity for the second component of the fluid. The first portion of the material is positioned with relation to the first outlet such that the first component is directed from said device through the first outlet. The second portion of the material is positioned with relation to the second outlet such that the second component is directed from the device through the second outlet.

The present invention has use wherever there is a need to separate components of a fluid. For example present invention has use for separating a mixture of chemicals in a hazardous waste stream, separation of biomolecules from a cellular extract, fractionation of a complex mixture of hydrocarbons, forensic analysis of chemical specimens, and sample preparation for subsequent analysis. The present invention also has use for separating chemical or biological sample preparation prior to detection, environmental monitoring for hazardous or illicit materials, high throughput screening of novel compounds for biological activity, high throughput screening of novel pharmaceuticals, drug discovery, and forensic analysis of chemical specimens.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1A:
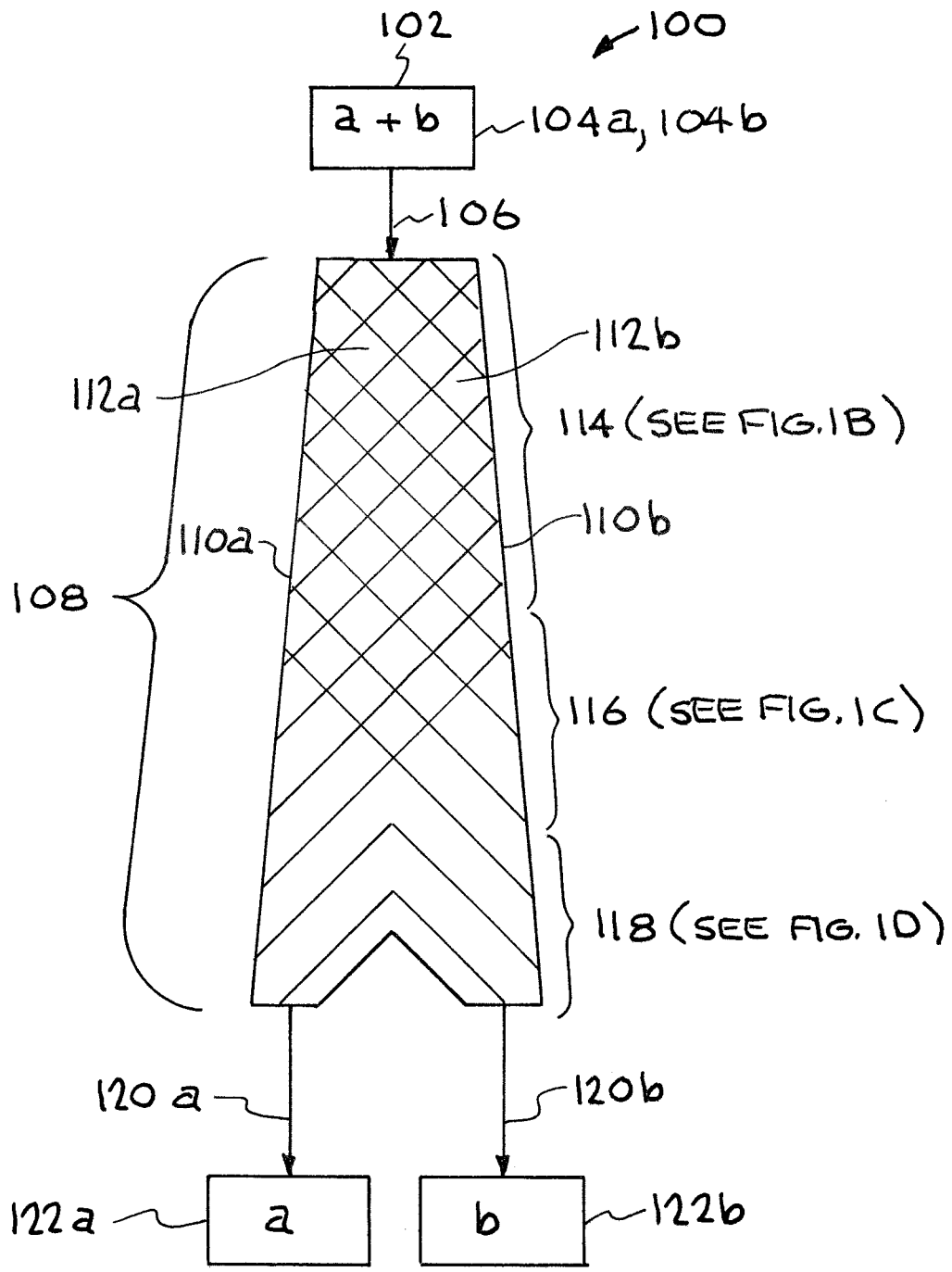
FIGS. 1A, 1B, 1C, and 1D illustrate a system for separation of components of a fluid.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides methods and apparatus for separating components of a fluid using a functionally graded material. Various embodiments of the present invention are contemplated, for example embodiments of the present invention provide methods and apparatus for separating chemical components of mixed fluid or multiple components dissolved in a solvent or carrier gas using a functionally graded material.

Definitions

As used in this application the terms below have the following definitions:

Fluid: A liquid, gas, Newtonian fluid, or non-Newtonian fluid

Chemical: A molecule, monomer, oligomer, polymer, biological polymer, or ion.

Gradient: A spatial change specifically in reference to a material or a material property. The gradient can be smooth, e.g. a gradual transition from one material to another, or abrupt, e.g. one material abutting another.

Porous: A material is porous if it contains interconnected void space through which fluid can flow. It may be a monolithic material with channels throughout, or a packed bed of particles where the pore space is formed in the interstitial space.

Reversible interaction: An interaction in which a chemical does not become permanently bound to a receptor, material, or another chemical.

Figure 1B:
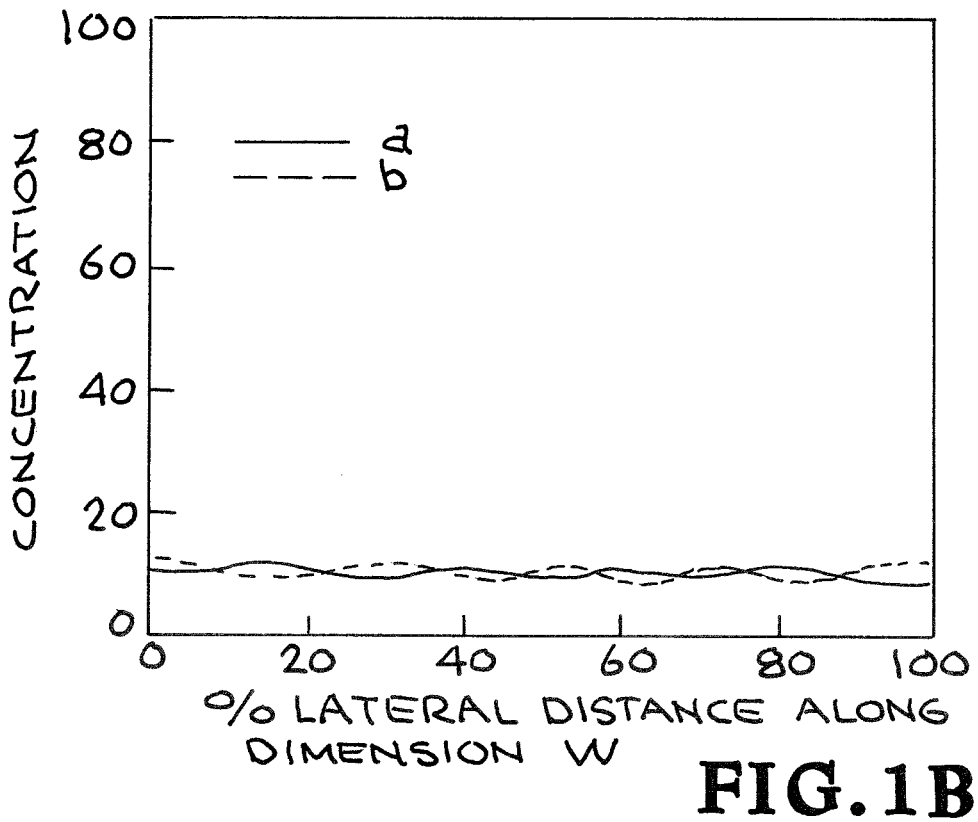

Referring now to the drawings and in particular to FIGS. 1A and 1B, a system and device of the present invention for separation of components of a fluid is illustrated. The system/device is designated generally by the reference numerical 100. The system/device is depicted as separating two components ("A" & "B"); however, it is to be understood that the present invention is not limited to the separation of two components, but provide separation of more than two components. Furthermore, the device is depicted as containing two outlets; however, it is to be understood that the device may contain any number of outlets. It is to be understood that the two components of the fluid are separated and that one of the two separated components can be the fluid carrier itself.

The system/device 100 separates components of a fluid. The fluid contains at least a first component and a second component. The fluid may contain additional components and the present invention also provides a system for separating these additional components. The system/device has an inlet for introducing the fluid into the device. The device has a first outlet for directing the first component of the fluid from the device and a second outlet for directing the second component of the fluid from the device. A material that has a gradient in properties is located in the device between the inlet and the first and second outlets such that the gradient in properties is perpendicular to the direction of fluid flow of the fluid from the inlet to the outlets. The material has a first portion with an affinity for the first component of the fluid and a second portion with an affinity for the second component of the fluid. The first portion of the material is positioned with relation to the first outlet such that the first component is directed from said device through the first outlet. The second portion of the material is positioned with relation to the second outlet such that the second component is directed from the device through the second outlet.

As illustrated in FIG. 1A, a fluid 102 contains component "a" designated by the reference numeral 104a and component "b" designated by the reference numeral 104b. It is to be understood that either component "a" or component "b" can be the fluid carrier itself. The system/device 100 separates the stream 106 of fluid 102 into two separate streams that exit the system/device 100. The exit/stream 120a contains the component A and the exit/stream 120b contains the component B. The separation is accomplished by flowing the fluid 102 through the device 100 containing a porous material wherein the porous material has a gradient in properties perpendicular to the direction of flow of the fluid. These properties are generally referred to as chemical affinity and may include surface chemistry, chirality of surface groups or pore structure, pore size, specific chemical functionality, stereochemistry, electric charge, receptor identity or density, and/or polarity, but are not limited to these properties. As the fluid 102 flows through the device 100, the components interact with this gradient through reversible interactions and are displaced laterally such that streams enriched in the individual components emerge at the exits/stream 120a and 120b of the device at distinct locations along an edge of the material and/or device producing separated fluid component "a" designated by the reference numeral 122a and separated fluid component "b" designated by the reference numeral 122b.

The device 100 contains a material that has a gradient in chemical affinity for two chemicals of interest (denoted "a" and "b" in FIG. 1A) such that the chemical affinity for "a" is greatest along edge 110a and correspondingly the chemical affinity for "b" is the lowest while the chemical affinity for "b" is greatest along edge 110b and correspondingly the chemical affinity is the lowest for 'a'. The properties leading to chemical affinity gradient are present throughout the material. The present invention is not of a particular material that exhibits these properties, but rather is the concept that a graded material that is patterned in this way may be used to separate mixtures. The affinity graded material will be assembled into a suitable microfluidic network such that a combined stream of "a" and "b" is flowed into the material through an inlet such that the direction of flow is perpendicular to the affinity gradient. As the stream 106 flows through the material, the chemical species migrate up the affinity gradients by diffusion and reversible interactions with the chemical affinity gradient. They accumulate in their respective area of highest affinity. This can be seen in biased lattice diffusion models illustrated generally by FIGS. 1B, 1C, and 1D.

After the chemical species have equilibrated across the gradient (which occurs near the outlet 120a, 120b), the components are enriched at their respective points of highest affinity.

One of the advantages of this separation over chromatography is that it can be a continuous process (a continuous stream of the chemical mixture can be fed to the device and the material is continuously separated into its constituents), and it can be run at steady-state (the state of the system at any time is the same as at any other time). However, it is to be understood that the system of the present invention need not run in a continuous fashion or at steady-state.

Operation of System for Separation of Components of a Fluid

Figure 1C:
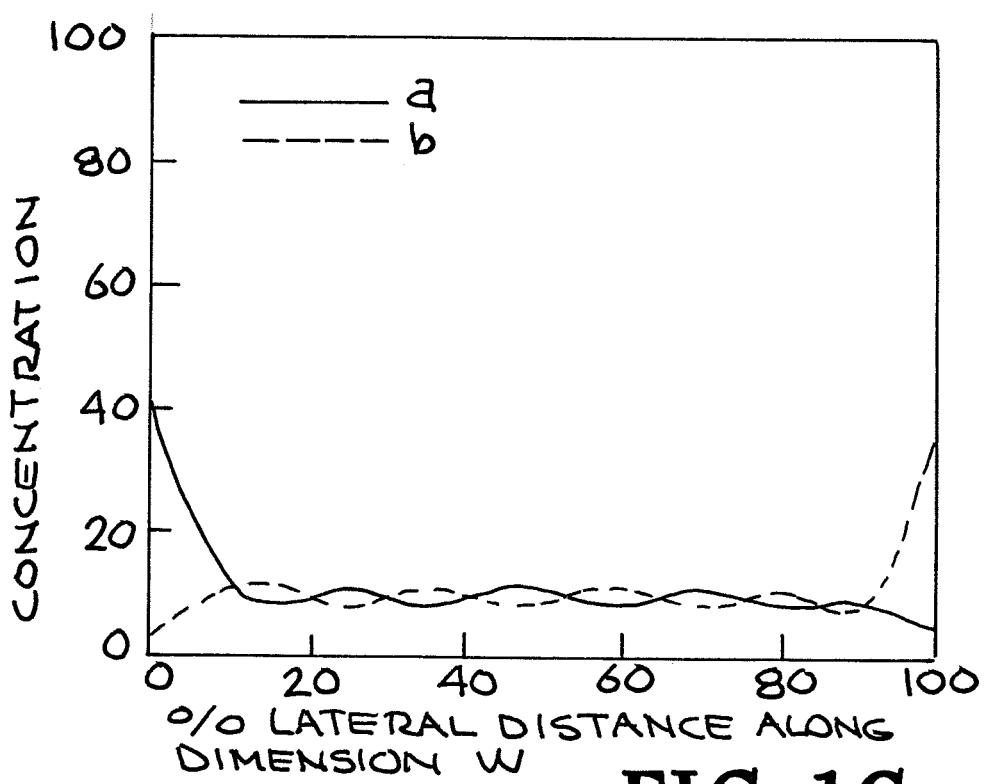
Figure 1D:
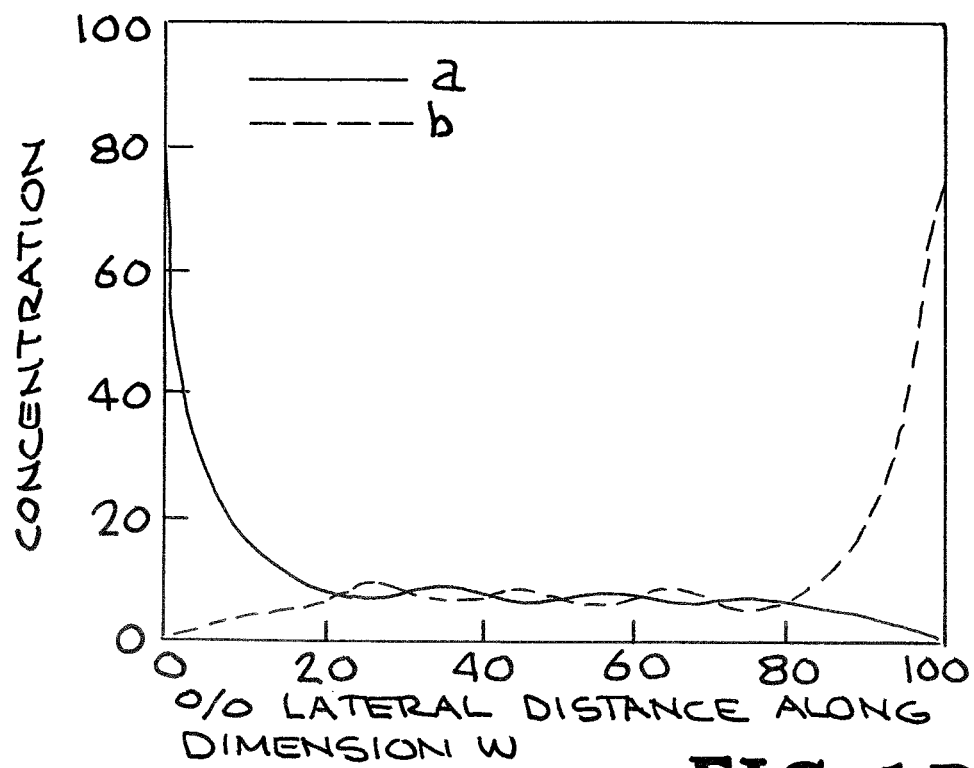

FIG. 1A illustrates the overall system 100 for separation of components of a fluid and the diffusion models are illustrated by FIGS. 1B, 1C, and 1D. FIG. 1A will be used to illustrate and describe in a simplified version of the system/device 100, how this invention operates. A fluid source 102 contains the substances 104a and 104b. A stream 106 of the fluid 102 enters the column 108. The column 108 contains two materials 112a and 112b. The material 112a is on the side 110a of the column 108. The material 112a has an affinity for the substance 104a in the fluid 102. The material 112b is on side 110b of the column 108 and has an affinity for the substance 104b in fluid 102.

As the fluid 102 containing the two substances 104a and 104b descends down through the column 108, the two substances 104a and 104b will begin to migrate to the side of the column 108 that has the material with an affinity for that substance, in this case substance 104a will migrate to the affinity material 112a on side 110a of column 108 and the substance 104b will migrate to affinity substance 112b on the side 110b of column 108.

As illustrated in FIG. 1A, the column 108 has been divided into three zones 114, 116 and 118. In zone 114 the two substances 104a and 104b are still mixed together in the fluid 102. FIG. 1B illustrates this in a graphical form wherein the substance 104a is shown as a solid line and substance 104b is shown as a dotted line. In zone 116 the substances are starting to separate and migrate up their respective affinity gradient. FIG. 1C illustrates this in a graphical form. Lastly in zone 118 the two substances are mostly separated as illustrate graphically in FIG. 1D. The two substances exit column 108 as the streams 120a and 120b and are collected at 122a and 122b for analysis, etc.

EMBODIMENTS OF THE INVENTION

Figure 2A:
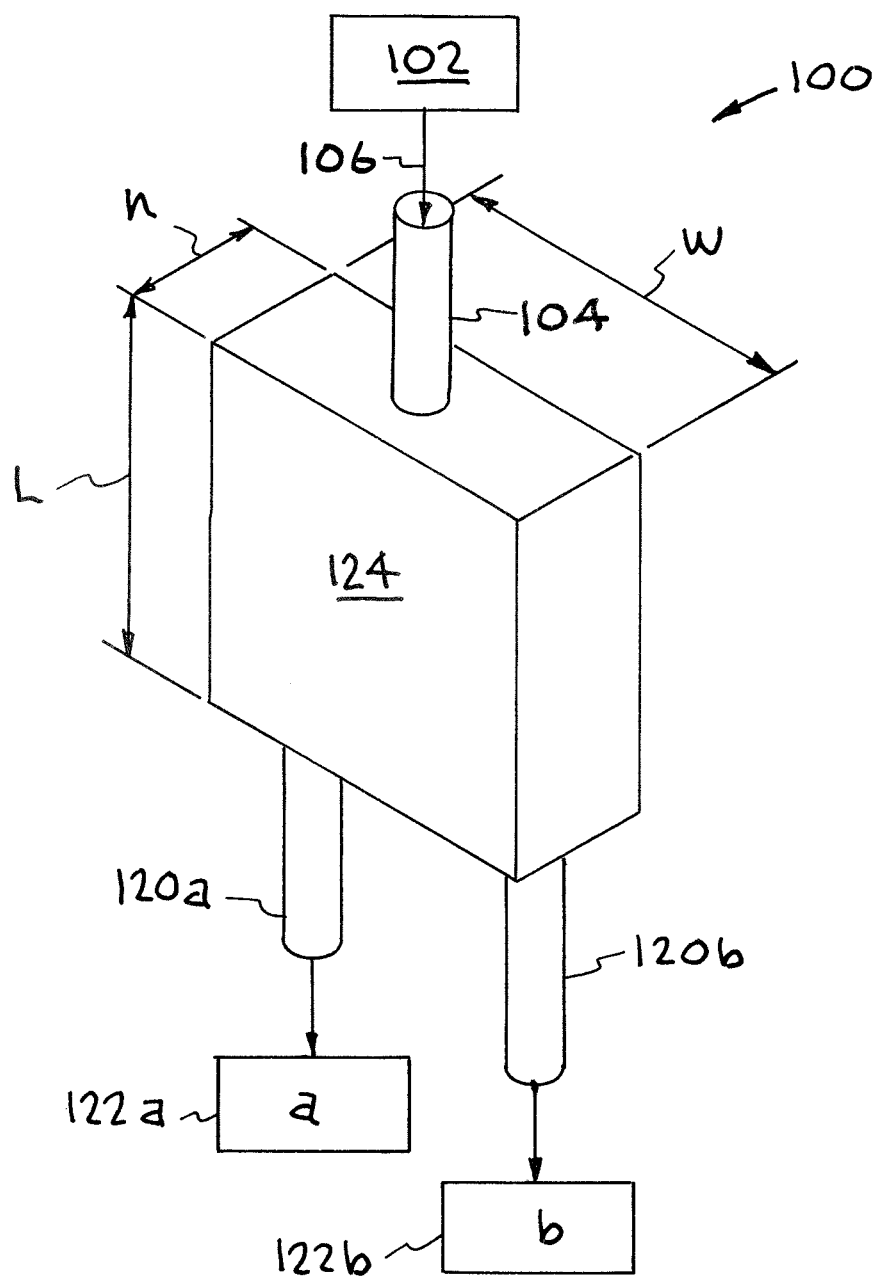
FIGS. 2A, 2B, and 2C illustrate various embodiments of systems constructed in accordance with the present invention.
Figure 2B:
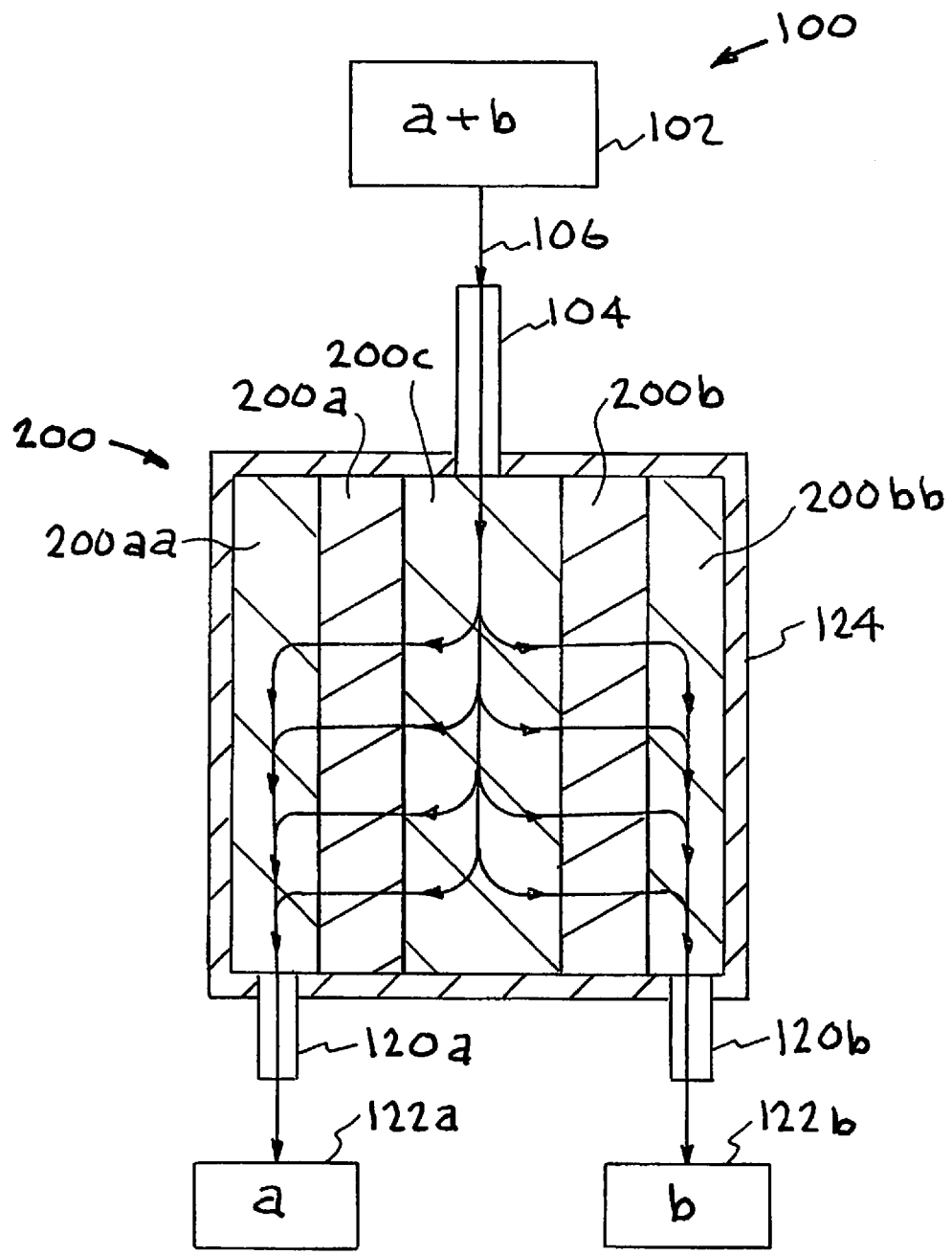
Figure 2C:
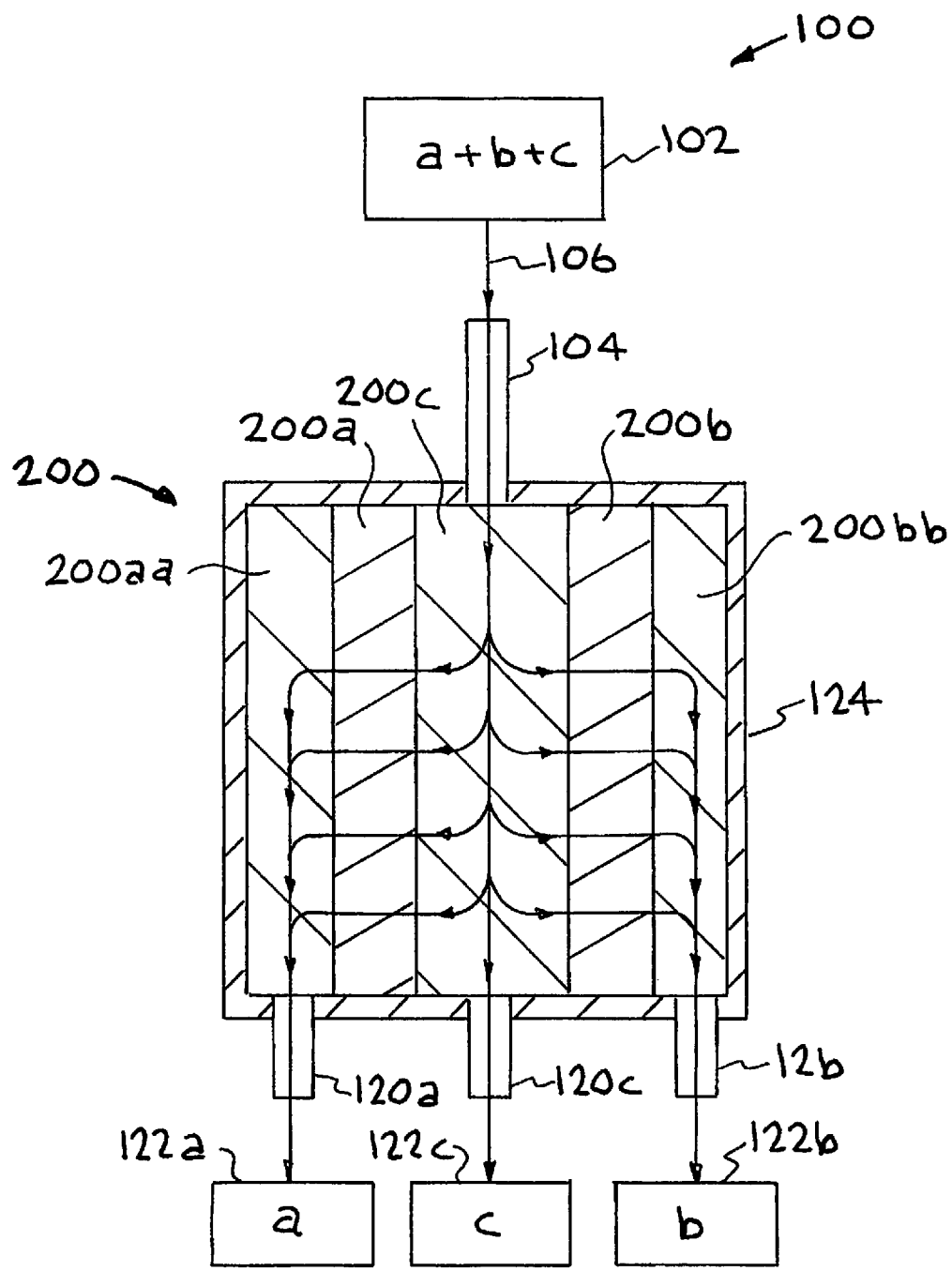

Referring now to FIGS. 2A, 2B and 2C, various embodiments of systems/devices constructed in accordance with the present invention are illustrated. The embodiment are designated with the same or similar reference numerals used in connection with FIG. 1A as far as possible. Referring now to FIG. 2A, a system/device 100 separates components of a fluid mixture 102 that contains multiple components. The separation is accomplished by flowing (designated by the reference numeral 106) the fluid mixture through a cell 124 containing a material that has a gradient in chemical affinity for the components to be separated. As the mixture 102 flows through the cell 124, the components experience this gradient and are displaced laterally, accumulating in their area of highest chemical affinity. The outlets 120a and 120b carry streams that are enriched in the respective components and are emerge from the areas of their respective highest affinity. The material in cell 124 is a functionally graded material (FGM) that is patterned to have a gradient in material properties perpendicular to the direction of flow through the device. The mixture flows into the device through inlet 104, is carried through the FGM were separation occurs, and multiple streams emerge from the FGM that are enriched in components of interest. The materials properties that vary across the material may be chemical affinity, surface chemistry, chirality of surface groups or pore structure, or pore size, but are not limited to those properties. The operating principle of the device requires that the device dimensions as labeled in FIGS. 2A and 2B be related as follows:

$$\frac{L}{W^2} \geq \frac{U}{D} \quad \text{[Equation 1]}$$

where L is the length of the device in the flow direction, W is the width of the chemical prism in the gradient direction, U is the flow velocity, and D is the diffusivity of the slowest diffusing component to be separated. Dimension n is determined the by volumetric flow requirements of specific process in which the device is employed.

Referring now to FIG. 2B, stream 106 containing components "a" and "b" enter device 124 through inlet 104 and contact FGM 200. The components move laterally through FGM 200 via diffusion whilst being convected down through the device entrained in the fluid flow. The chemical affinity for component "a" is greatest in section 200aa with decreasing chemical affinity in section 200a, 200c, 200b, 200bb, respectively. The chemical affinity for component "b" is greatest in section 200bb with decreasing chemical affinity in section 200b, 200a, 200c, 200aa, respectively. As the components diffuse across FGM 200, they accumulate in the regions of highest chemical affinity. Thus, stream 122a exiting the device through outlet 120a has a high concentration of component "a" and a low concentration of component "b" relative to the inlet stream 106. Furthermore, stream 122b exiting the device through outlet 120b has a high concentration of component "b" and a low concentration of component "a" relative to the inlet stream 106.

Referring now to FIG. 2C, stream 106 containing components "a", "b", and "c" enter device 124 through inlet 104 and contact FGM 200. The components move laterally through FGM 200 via diffusion whilst being convected down through the device entrained in the fluid flow. The chemical affinity for component "a" is greatest in section 200aa with decreasing chemical affinity in section 200a, 200c, 200b, 200bb, respectively. The chemical affinity for component "b" is greatest in section 200bb with decreasing chemical affinity in section 200b, 200a, 200c, 200aa, respectively. The chemical affinity for component "c" is greatest in section 200c with decreasing chemical affinity in section 200a and 200b, 200aa and 200bb, respectively. As the components diffuse across FGM 200, they accumulate in the regions of highest chemical affinity. Thus, stream 122a exiting the device through outlet 120a has a high concentration of component "a" and a low concentration of component "b" and component "c" relative to the inlet stream 106. Stream 122b exiting the device through outlet 120b has a high concentration of component "b" and a low concentration of component "a" and component "c" relative to the inlet stream 106. Stream 122c exiting the device through outlet 120c has a high concentration of component "c" and a low concentration of component "a" and component "b" relative to the inlet stream 106.

Making Systems for Separating Chemical Components of Mixed Fluid

Applicants will describe system for making systems for separating chemical components of mixed fluid using a gradient material of the present invention. While there are many ways to construct the FGM with desired properties, such as tape casting, fluidic assembly, gravitational settling, centrifugation, etc., the preferred embodiment utilizes an electrophoretic deposition process; however it is to be understood that the system for making systems for separating chemical components of mixed fluid using a gradient material of the present invention can be made using other systems.

The Electrophoretic Deposition Process.

Particles of the material to be deposited are driven from suspension to the deposition electrode via an electric field in the deposition chamber. A programmable fluid handling system allows precise control over the composition of the deposition suspension, and thus the gradients produced in the final deposit. The composition in the x-y plane can also be tailored using a dynamic, optically defined electrode. Gradient materials deposited with EPD can display both sharp and smooth transitions in properties, in this case, particle size. The annotations give the particle diameters in each layer.

Using electrophoretic deposition techniques Applicants were able to construct materials that have the precise gradients needed to construct a chemical prism. Electrophoretic deposition (EPD) utilizes electric fields to deposit nano- and microscale colloids from a solvent onto the surface of an electrode. By controlling the composition of the colloidal suspension through the use of a fluidic sequencer and patterning an optically actuated electrode with a dynamic mask, we are able to precisely fabricate arbitrary microscale gradients of materials and properties along the x-, y-, & z-axes. This is a general technique that can be used to create materials with gradients on the required length scale in virtually any material property, including chemical affinity and composition, as the properties of the deposit are controlled by the physicochemical properties of the constituent colloidal building blocks. Furthermore, since the deposition process deposits colloids, the final material contains inherent macroporosity that aids in transport of fluid through the bed.

Figure 3B:
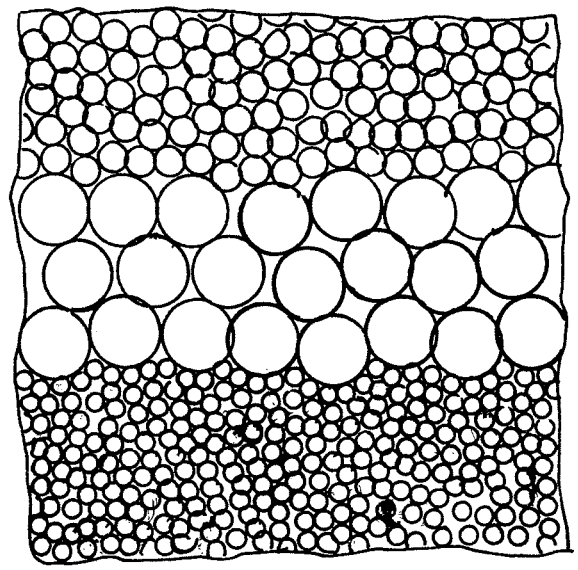
FIGS. 3A and 3B illustrate the making of the systems of the present invention including the systems shown in FIGS. 1A, 1B, 2A, 2B and 2C.
Figure 3A:
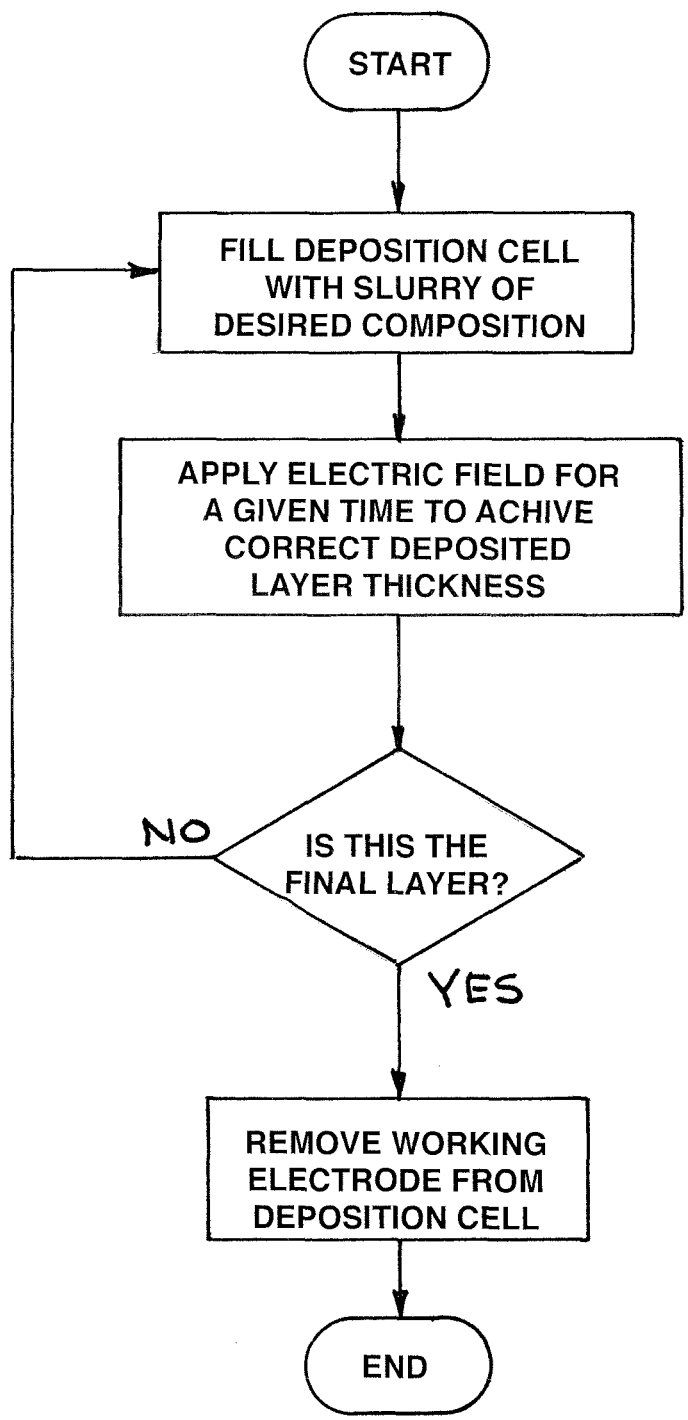

Referring now to FIG. 3A, a flowchart for the EPD process. EPD is performed in a deposition cell which is comprised of two electrodes ("working" and "counter") that are separated by a reservoir of fluid containing suspended particles of the material to be deposited ("slurry"). The process begins with the cell containing the electrodes connected to a power supply. The slurry is pumped into the reservoir. An electric field is applied between the electrodes which drives the suspended particles to the working electrode, where they deposit as a film. The electric field is removed when the deposited layer is of the desired thickness. Another layer can be deposited by refilling the reservoir with a slurry of different composition. This process is repeated until the desired number of layers are achieved.

Referring now to FIG. 3B, depicting a material deposited via EPD comprised of three layer. A layer of small particles was deposited initially, followed by a layer of large particles, and finally, a layer of intermediate sized particles.

Parallel Array for Separating Chemical Components of Mixed Fluid

Figure 4:
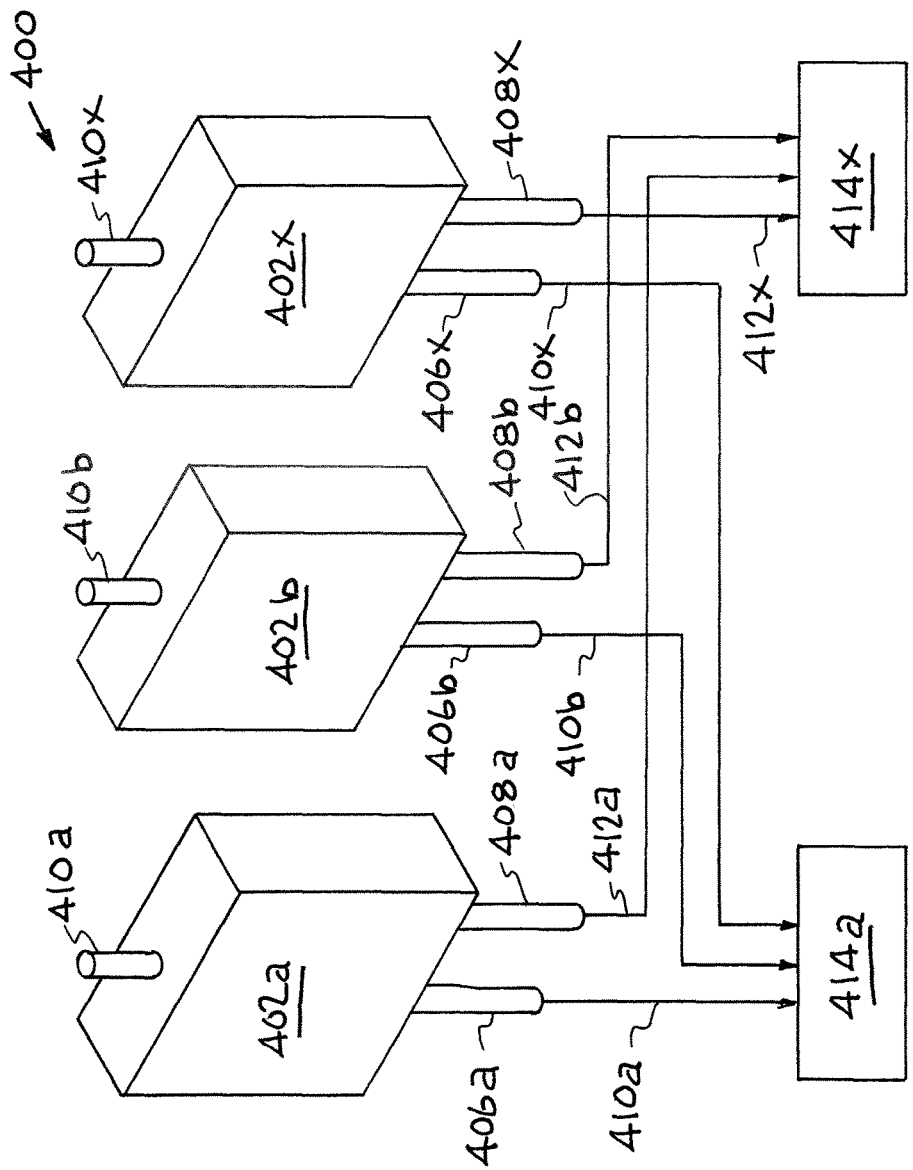
FIG. 4 illustrates a parallel array for separating components of fluid with the array.

Referring now to FIG. 4, a parallel array for separating chemical components of mixed fluid using a gradient material constructed in accordance with the present invention is illustrated. The parallel array is designated generally by the reference numeral 400.

A multiplicity of devices 402a, 402b, 402x, etc, can be arrayed in parallel to increase throughput and/or accommodate inlet streams from multiple process. The devices are depicted as containing two outlets; however, it is to be understood that the devices may contain any number of outlets. The inlets 410a, 410b, 410x can be from a common stream or streams originating from different processes. If the inlets originate from a common stream, the FGM within each device will be identical and the purpose is to increase the volumetric throughput of the separation system. If the inlets originate from different processes, the inlets may in general, but not necessarily, contain different components. In this case, the FGM in an individual device may be the same or different from other devices in the array. The streams 410a, 410b, 410x emerging from outlets 406a, 406b, 406x respectively would be combine into a single stream 414a for further processing and may be enriched in one or multiple components with respect to the inlet streams. Likewise, the streams 410a, 410b, 410x emerging from outlets 408a, 408b, 408x respectively would be combined into a single stream 414x for further processing and may be enriched in one or multiple components with respect to the inlet streams.

Series Array for Separating Chemical Components of Mixed Fluid

Figure 5:
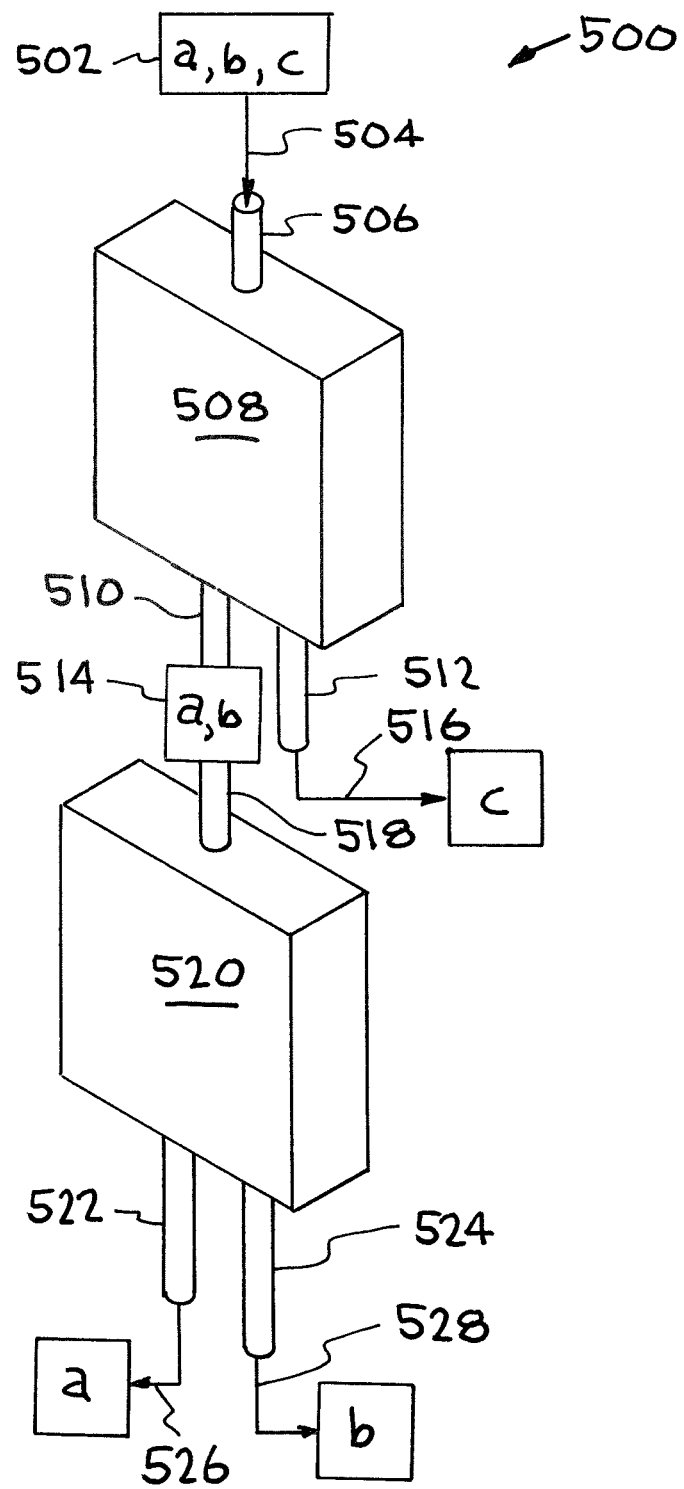
FIG. 5 illustrates a series array for separating components of fluid with the array.

Referring now to FIG. 5, a series array for separating chemical components of mixed fluid using a gradient material constructed in accordance with the present invention is illustrated. The devices 508 and 520 can be arrayed in series to increase the quality of separation. The devices are depicted as containing two outlets; however, it is to be understood that the devices may contain any number of outlets. In one possible configuration, an incomplete separation of components in one stage can be resolved in subsequent stages by utilizing an FGM of differing composition in each stage. This is depicted as assembly 500. Stream 504 containing components "a", "b", and "c" enters the first stage device 508 through inlet 506. The FGM contained in device 508 is not sufficient to separate components "a" and "b", so stream 514 containing both exits the device through outlet 510. Stream 516 exits through outlet 512 and is enriched in component "c" and depleted in components "a" and "b" with respect to inlet stream 504. Stream 514 enters the second stage device 520 through inlet 518. The FGM contained in device 520 differs from that in 508 in that it is sufficient to separate components "a" and "b". Stream 526 enriched in "a" exits the device through outlet 522 and stream 528 enriched in "b" exits through outlet 524.

In another possible configuration, an arbitrary level of enrichment of a desired compound can be achieved even if the per stage efficiency is low utilizing the an FGM of the same composition in each stage.

Figure 6:
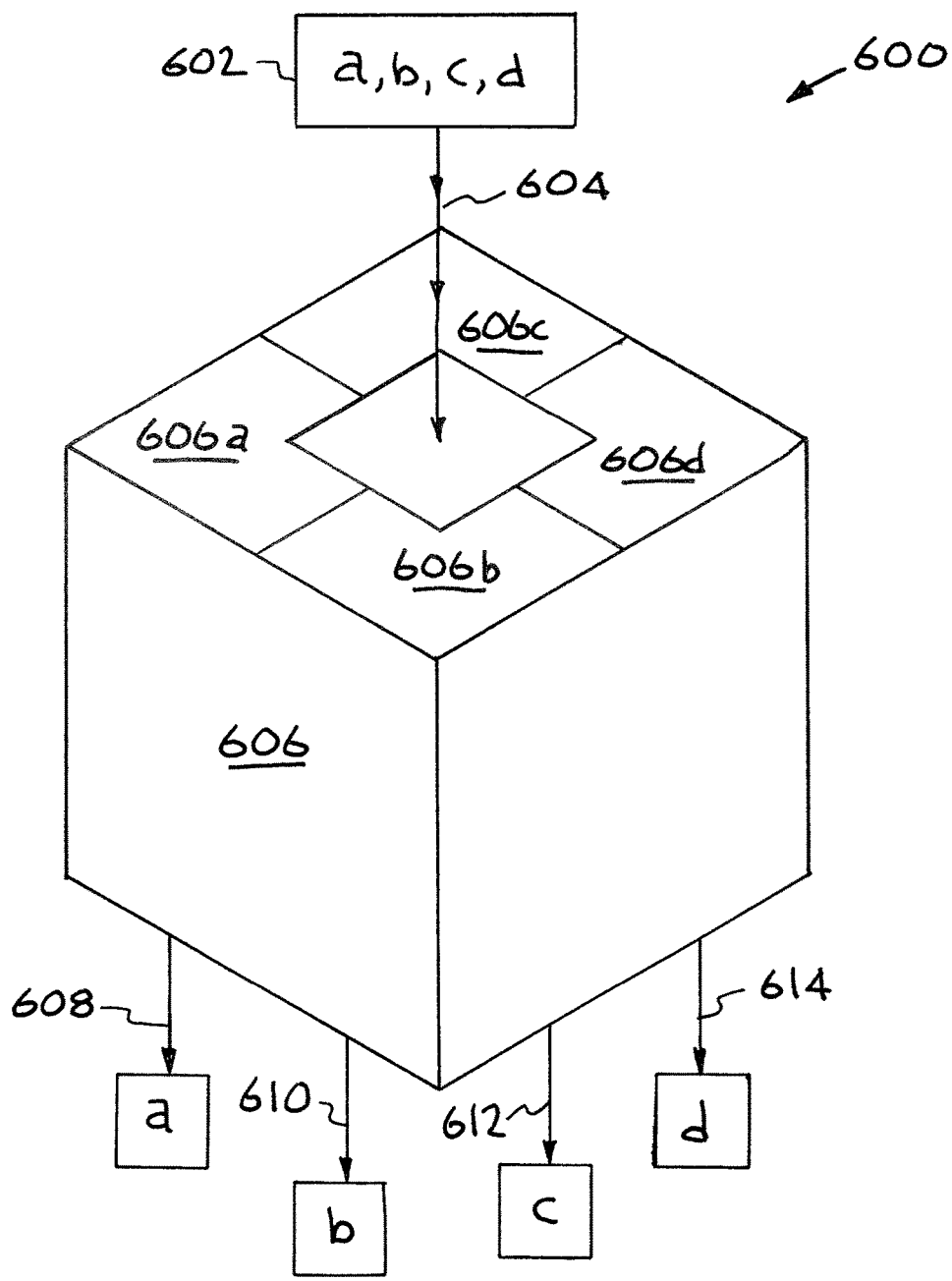
FIG. 6 illustrates another embodiment of a system for separation of components of a fluid.

FIG. 6 illustrates another embodiment of a system for separation of components of a fluid in which the FGM has gradients in properties along both directions that are perpendicular to the fluid flow direction. This is depicted as assembly 600. Stream 604 contains components 602 identified as "a", "b", "c", and "d" and enters through inlet 604 that is along the centerline of FGM 606. FGM 606 is patterned such that each quadrant has a high chemical affinity for one component and low chemical affinity for others. For instance, quadrant 606a has a high affinity for component "a" and low affinity for components "b", "c", and "d", etc. As the fluid flows through the bed, the components migrate to regions of highest affinity; namely, stream 608 is enriched in component "a", stream 610 enriched in component "b", stream 612 enriched in component "c", and stream 614 enriched in component "d".

The present invention is further described and illustrated by a number of examples of systems constructed in accordance with the present invention. Various changes and modifications of these examples will be apparent to those skilled in the art from the description of the examples and by practice of the invention. The scope of the invention is not intended to be limited to the particular examples disclosed and the invention covers all modifications, equivalents, and alternatives falling within the spirit and scope of the invention as defined by the claims.

Example 1—Removing Benzene from Water

A device is constructed with dimensions W=25 microns, L=6 cm, n=1 cm. The goal is to separate trace amounts of benzene from water. Benzene has a high chemical affinity for C18 bonded silica while water has a high affinity for silica.

The FGM is comprised of a layer of 200 nm diameter C18 bonded silica deposited to a thickness of 12.5 microns via EPD, while 200 nm diameter silica is deposited in the remaining 12.5 microns. The stream emanating from the outlet of the C18 bonded layer has a higher concentration of benzene that the inlet, while the stream emanating from the silica outlet is purified water.

Example 2—High Throughput Screening of Molecules for Biological Activity

Acetylcholinesterase (AChE) is an enzyme involved in proper neural functioning. Development of drugs that reversibly bind to AChE can prevent fatalities from exposure to certain classes of pesticides.

AChE is immobilized on a porous silica support such that a linear gradient in AChE surface density is present across the support. This support is the FGM and is inserted into a microfluidic network such that the flow through the FGM is perpendicular to the AChE gradient.

The inlet stream is composed of a multitude of chemical compounds generated using combinatorial chemistry techniques that may reversibly bind to AChE. The device has two outlets. One outlet corresponds to the region of the FGM that has the high AChE through which exit in high concentration chemicals that reversibly bind to AChE. These compounds can then be further separated using standard chemical separation techniques and identified as drug candidates. The other outlet stream contains high concentration of chemicals that do not bind to AChE and can be discarded.

Example 3—Parallel Array with a Common Inlet

An array of devices are constructed with each with dimensions W=25 microns, L=6 cm, n=1 cm. The goal is to separate benzene from water. Benzene has a high chemical affinity for C18 bonded silica while water has a high affinity for silica.

The FGM in each device is comprised of a layer of 200 nm diameter C18 bonded silica deposited to a thickness of 12.5 microns via EPD, while 200 nm diameter silica is deposited in the remaining 12.5 microns. The maximum flow rate through any device is 1 microliter per second. However, the goal is to process 1 milliliter per second of the benzene-water mixture. Therefore, 1000 of the devices are arrayed in parallel with each device receiving only 1 microliter per second from a common inlet stream.

Example 6—Parallel Array with Inlets from Separate Processes

Suppose benzene is to be recovered from both a benzene-water mixture and from a benzene-hexane mixture. A first device is constructed as in Example 1 to separate the benzene-water mixture. A second device is constructed to the same dimensions, but the FGM is comprised of a layer of phenyl bonded silica, which has a high affinity for benzene, and C12 bonded silica, which has a high affinity for hexane. The inlet to the first device is the benzene-water mixture. The inlet to the second device is the benzene-hexane mixture. Benzene is collected at the outlets corresponding to the C18 bonded silica in the first device and the phenyl bonded silica in the second. These streams can now be combined for further processing. Water is collected at the outlet corresponding to the silica in the first device, while hexane is separately collected at the outlet corresponding to C12 bonded silica in the second device.

Example 7—Series Array for Separation for Resolution of Complex Mixtures

Suppose benzene, hexane, and water are to be separated into streams of enriched in each component. The first stage in the series is constructed as in Example 1. Where both benzene and hexane have a high affinity for C18 bonded silica, and water has a high affinity for silica. The second stage is a device like the second device in Example 6.

The benzene-hexane-water mixture is flowed into the inlet of the first stage. A stream of purified water emerges from the outlet corresponding to the silica. At the outlet corresponding to C18 bonded silica, a stream enriched is benzene and hexane emerges. This serves as the inlet to the second stage in which purified benzene is collected at the outlet corresponding to the phenyl bonded silica, while purified hexane emerges from the outlet corresponding to the C12 bonded silica.

Example 8—Separation and Identification of Known and Novel Illicit Substances

Suppose that a certain class of chemicals is declared illicit due to their interactions with a particular receptor. For example, two chemicals which are structurally unrelated may interact a similar way with a receptor and are hence illegal. A law enforcement agency is tasked with determining the presence and identity of illicit substances in a given sample that may contain previously unknown illicit substances and/or contain intentional or unintentional contaminants or adulterants.

The particular receptor is immobilized on a porous support material such that a gradient in surface density is present across the support. This support is the FGM and is inserted into a microfluidic network such that the flow through the FGM is perpendicular to the receptor gradient.

The inlet stream is composed of the sample or a solution containing the sample. The device has two outlets. One outlet corresponds to the region of the FGM that has the high receptor through which exits a stream with high concentration the illicit substances. These compounds can then be further separated using standard chemical separation techniques and identified. The other outlet stream contains high concentration of chemicals that are not illicit including the contaminant and adulterants.

Additional Examples

Additional examples of systems constructed in accordance with the present invention are summarized below. It is to be understood that various changes and modifications of these additional examples will be apparent to those skilled in the art from the summaries of the examples and by practice of the invention. The scope of the invention is not intended to be limited to the particular examples disclosed and the invention covers all modifications, equivalents, and alternatives falling within the spirit and scope of the invention as defined by the claims.

Additional Examples—Performing Microscale Chemical Separations a. Separating two or more chemicals based on polarity b. Separating two or more chemicals based on chirality c. Separating two or more chemicals based on stereochemistry d. Separating two or more chemicals based on size or shape e. Separating two or more chemicals based on affinity for a receptor f. Separating two or more chemicals based on electric charge g. Separating two or more chemicals or ions based on isotopic composition Additional Example—Concentration or Dilution of a Chemical Stream h. Transforming a dilute stream of one or more chemicals in a solvent into a stream more concentrated in one, some, or all of the chemicals.
  i. Preconcentration before detection
  ii. Purification of industrial products
  iii. Purification of high-value fine chemicals and pharmaceuticals i. Transforming a dilute stream of one or more chemicals in a solvent into a stream even more dilute in one, some, or all of the chemicals.
  i. Hazardous waste mitigation or remediation
  ii. Manufacturing ultrapure solvents
  iii. Water purification Additional Example—Discovery of Compounds with Novel Activity j. A gradient in a receptor of interest can separate chemicals that bind to the receptor from those that do not
  i. High throughput screening of drug candidates in drug discovery
  ii. A chemical detector that responds to known and previously unknown chemicals Additional Example—Detection of Known and Novel Chemical Warfare Agents Additional Example—Detection of Known and Novel Illicit Substances Additional Example—as a Sample Preparation Step for General Chemical Detection k. Preconcentration and separation prior to detection
  i. Allows a less specific and cheaper detector to be used
  ii. Allows for a lower detection limit
  iii. Used to prevent fouling of a sensor
  iv. Compact detection systems, portable and/or handheld.

Additional Example—Separation of Gaseous Mixtures

Additional Methods and Apparatus

The present invention provides a method of separating components of a fluid containing at least a first component and a second component that includes the steps of providing a material that has a gradient in properties including a first portion with an affinity for the first component and a second portion with an affinity for the second component, flowing the fluid containing at least a first component and a second component into the material, flowing the first component of the fluid to the first portion of the material with an affinity for the first component of the fluid, flowing the second component of the fluid to the second portion of the material with an affinity for the second component of the fluid, flowing the first component of the fluid from the first portion of the material with an affinity for the first component of the fluid, and flowing the second component of the fluid from the second portion of the material with an affinity for the second component of the fluid thereby separating the components of the fluid.

The present invention provides an apparatus for separating components of a fluid containing at least a first component and a second component that includes a device; an inlet in the device for flowing the fluid containing the first component and the second component into the device; a first outlet in the device for flowing the first component from the device; a second outlet in the device for flowing the second component from the device; and a material in the device between the inlet and the first and second outlets wherein the fluid containing the first component and the second component flow from the inlet through the material and wherein the material has a gradient in properties, the material having a first portion with an affinity for the first component and a second portion with an affinity for the second component; wherein the first portion of the material is positioned with relation to the first outlet such that the first component of the fluid is drawn to the first portion of the material with an affinity for the first component and wherein the first component of the fluid flows from the device through the first outlet, and wherein the second portion of the material is positioned with relation to the second outlet such that the second component of the fluid is drawn to the second portion of the material with an affinity for the second component and wherein the second component of the fluid flows from the device through the second outlet.

The present invention provides a method of making a device for separating components of a fluid containing at least a first component and a second component including the steps of producing a device having an inlet, a first outlet, and a second outlet; and providing a material with a gradient in properties in the device between the inlet and the first and second outlets, the material having a first portion with an affinity for the first component and a second portion with an affinity for the second component wherein the step of providing a material with a gradient in properties comprises using electric fields to deposit nano- and microscale colloids from a solvent onto the surface of an electrode and controlling the composition of the nano- and microscale colloidal suspension to produce microscale gradients of materials.

The present invention provides a system for separating components of a fluid containing at least a first component and a second component. The system includes an array of a multiplicity of devices with the devices arranged in parallel, each device having an inlet for flowing the fluid into the device, each device having a first outlet, each device having a second outlet, and each device having a material between the inlet and the first and second outlets wherein the fluid containing the first component and the second component flow from the inlet into the material and wherein the material has a gradient in properties, the material having a first portion with an affinity for the first component and a second portion with an affinity for the second component; wherein the first portion of the material is positioned with relation to the first outlet such that the first component of the fluid is drawn into the first portion of the material with an affinity for the first component and wherein the first component of the fluid flows from the first portion of the material out of the device through the first outlet, and wherein the second portion of the material is positioned with relation to the second outlet such that the second component of the fluid is drawn into the second portion of the material with an affinity for the second component and wherein the second component of the fluid flows from the second portion of the material out of the device through the second outlet.

The present invention provides a system for separating components of a fluid containing at least a first component and a second component. The system includes an array having a multiplicity of devices arranged in series; each device having an inlet for flowing the fluid containing the first component and the second component into the device; each device having a first outlet; each device having a second outlet; and each device having a material with a gradient in properties between the inlet and the first and second outlets, the material having a first portion with an affinity for the first component and a second portion with an affinity for the second component; wherein the first portion of the material is positioned with relation to the first outlet such that the first component of the fluid is drawn into the first portion of the material with an affinity for the first component and wherein the first component of the fluid flows from the first portion of the material out of the device through the first outlet, and wherein the second portion of the material is positioned with relation to the second outlet such that the second component of the fluid is drawn into the second portion of the material with an affinity for the second component and wherein the second component of the fluid flows from the second portion of the material out of the device through the second outlet; and wherein the multiplicity of devices are connected in series to produce the array with the first outlet of a device connected to an inlet of another device.

The present invention provides a system for performing separation and/or preconcentration, prior to detection, of one or multiple analytes of interest from a continuous stream containing the analytes and other chemicals using a material that has a gradient in receptor density. The receptors chosen would be tailored such that their interactions with the analytes are specific and reversible.

The present invention provides a system for separating the components of the sample using a gradient in the concentration of a specific target receptor such that binding to the receptor acts as a screen to separate known and unknown analytes that have a specific affinity for the receptor. The analytes that bind to the receptors will accumulate where there is the highest concentration of receptors. The analytes exit the device from a port connected to the region with highest concentration of receptors.

Since only analytes of interest enter the detector, this device will reduce the false positive rate, and the detector need not be made robust to environmental contamination. For example, suppose one has a chemical detector that is sensitive to a particular class of compounds (it can determine if the compounds are present in sample at low concentrations), but it is not selective (it responds to other classes of compounds as well as compounds of interest). Passing an environmental sample through such a detector will result in a high false positive rate, thus, a sample preparation step is employed. For example, suppose one wishes to determine if a chemical is present in an environmental sample that inhibits a specific enzyme or binds to a particular antibody. The particular enzyme or antibody plays the role of the "receptor" and a gradient in its concentration is immobilized onto the surface of a porous material. All chemicals that bind to receptor will migrate to the region of highest receptor concentration and will exit the device at a higher concentration than at the entrance. All other compounds will not migrate and will not concentrate at the outlet. Thus, the stream that exits through the "active compounds" has been enriched only in the compounds that bind to the receptor. Additionally, if a receptor is known for the classes of chemical that lead to false positives, a gradient in this receptor can be immobilized counter to the other gradient. The stream exiting active compounds port will be enriched in the compounds of interest while simultaneously depleted in the inactive compounds that foul the detector. One advantage of this device is that the identities of the analytes do not need to be known a priori. For example, suppose one wishes to develop a drug that binds to a specific receptor site (X) within the body. One could use this device to discover which molecules bind to X by immobilizing a concentration gradient of X onto the surface of the porous material that makes up the device.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for separating components of a first fluid, components of a second fluid, and components of a third fluid wherein the first fluid, the second fluid, and the third fluid each contain at least a first component and a second component, consisting of:
   a first device;
   a second device;
   a third device, wherein said first device, said second device, and said third device are parallel;
   a first device inlet in said first device for flowing the first fluid containing the first component and the second component into said first device;
   a second device inlet in said second device for flowing the second fluid containing the first component and the second component into said second device;
   a third device inlet in said third device for flowing the third fluid containing the first component and the second component into said third device;
   a first device first outlet in said first device;
   a second device first outlet in said second device;
   a third device first outlet in said third device;
   a first component combining unit;
   a first device second outlet in said first device;
   a second device second outlet in said second device;
   a third device second outlet in said third device;
   a second component combining unit;
   a first material that has a gradient in properties in said first device,
   a second material that has a gradient in properties in said second device, and
   a third material that has a gradient in properties in said third device,
   wherein said first fluid has a direction of flow between said first device inlet and said first device first and second outlets with said gradient in properties of said first material being perpendicular to said direction of flow, said first material having a first portion with an affinity for the first component of the first fluid and a second portion with an affinity for the second component of the first fluid,
   wherein said second fluid has a direction of flow between said second device inlet and said second device first and second outlets with said gradient in properties of said second material being perpendicular to said direction of flow, said second material having a first portion with an affinity for the first component of the second fluid and a second portion with an affinity for the second component of the second fluid, and
   wherein said third fluid has a direction of flow between said third device inlet and said third device first and second outlets with said gradient in properties of said third material being perpendicular to said direction of flow, said third material having a first portion with an affinity for the first component of the third fluid and a second portion with an affinity for the second component of the third fluid;
   wherein the first fluid containing the first component and the second component flow through said first material,
   wherein the second fluid containing the first component and the second component flow through said second material,
   wherein the third fluid containing the first component and the second component flow through said third material,
   wherein said first device first outlet, said second device first outlet, and said third device first outlet are connected to said first component combining unit; and
   wherein said first device a second outlet, said second device second outlet, and said third device second outlet are connected to said second component combining unit.

2. A system for separating components of a common stream of a fluid wherein said fluid in said common stream includes a first fluid portion, a second fluid portion, and a third fluid portion all of which contain at least a first component and a second component, consisting of:
   an array of first, second, and third devices with said first, second, and third devices arranged in parallel,
   said first device having a first device inlet for flowing the first fluid portion of said common stream into said first device,
   said second device having a second device inlet for flowing the second fluid portion of said common stream into said second device,
   said third device having a third device inlet for flowing the third fluid portion of said common stream into said third device,
   said first device having a first device first outlet,
   said second device having a second device first outlet,
   said third device having a third device first outlet,
   a first component combining unit;
   said first device having a first device second outlet,
   said second device having a second device second outlet,
   said third device having a third device second outlet, a second component combining unit; and said first device having a first device material with a gradient in properties between said first device inlet and said first device first and said first device second outlets, said first device material having a first device first portion with an affinity for the first component and a first device second portion with an affinity for the second component;

said second device having a second device material with a gradient in properties between said second device inlet and said second device first and said second device second outlets, said second device material having a second device first portion with an affinity for the first component and a second device second portion with an affinity for the second component;

said third device having a third device material with a gradient in properties between said third device inlet and said third device first and said third device second outlets, said third device material having a third device first portion with an affinity for the first component and a third device second portion with an affinity for the second component;

wherein said first portion of said first device material is positioned with relation to said first device first outlet such that the first component of the first fluid portion is drawn into said first portion of said first device first material with an affinity for the first component and wherein the first component of the first fluid portion flows from said first portion of said first device material out of said first device through said first device first outlet, wherein said first portion of said second device material is positioned with relation to said second device first outlet such that the first component of the second fluid portion is drawn into said first portion of said second device first material with an affinity for the first component and wherein the first component of the first fluid portion flows from said first portion of said second device material out of said second device through said second device first outlet, wherein said first portion of said third device material is positioned with relation to said third device first outlet such that the first component of the third fluid portion is drawn into said first portion of said third device first material with an affinity for the first component and wherein the first component of the third fluid portion flows from said first portion of said third device material out of said third device through said third device first outlet, wherein said second portion of said first device material is positioned with relation to said first device second outlet such that the second component of the first fluid portion is drawn into said second portion of said first device material with an affinity for the second component and wherein the second component of the first fluid portion flows from said second portion of said first device material out of said first device through said first device second outlet, wherein said second portion of said second device material is positioned with relation to said second device second outlet such that the second component of the second fluid portion is drawn into said second portion of said second device material with an affinity for the second component and wherein the second component of the second fluid portion flows from said second portion of said second device material out of said second device through said second device second outlet, wherein said second portion of said third device material is positioned with relation to said third device second outlet such that the second component of the third fluid portion is drawn into said second portion of said third device material with an affinity for the second component and wherein the second component of the third fluid portion flows from said second portion of said third device material out of said third device through said third device second outlet;

wherein said first device first outlet, said second device first outlet, and said third device first outlet are connected to said first component combining unit; and wherein said first device second outlet, said second device second outlet, and said third device second outlet are connected to said second component combining unit.

* * * * *